United States Patent [19]

Nakagawa et al.

[11] 3,987,529
[45] Oct. 26, 1976

[54] VALVE AND METHOD FOR MANUFACTURING THE SAME

[75] Inventors: Yoshiro Nakagawa, Koganei; Kohei Nonaka, Tokyo; Chiyoshi Fukumoto, Shiga, all of Japan

[73] Assignee: Asahi Kasei Kogyo Kabushiki Kaisha, Osaka, Japan

[22] Filed: Nov. 29, 1973

[21] Appl. No.: 419,944

Related U.S. Application Data

[62] Division of Ser. No. 294,160, Oct. 2, 1972, abandoned.

[30] Foreign Application Priority Data

Nov. 1, 1971 Japan.............................. 46-86228

[52] U.S. Cl..................... 29/157.1 R; 29/156.7 A; 29/411; 29/412; 228/107; 228/109; 251/359
[51] Int. Cl.² ............................................ B23P 15/00
[58] Field of Search ........ 29/157.1 R, 470.1, 421 E, 29/486, 497.5, 411, 472.3, 481, 156.7 R, 156.7 A, 412, 417; 251/359; 228/107, 109

[56] References Cited
UNITED STATES PATENTS

| | | | |
|---|---|---|---|
| 1,732,241 | 10/1929 | Murray, Jr. | 251/359 |
| 1,959,068 | 5/1934 | Stoll | 251/359 |
| 2,065,628 | 12/1936 | Taylor et al. | 251/359 |
| 2,473,371 | 6/1949 | Heath et al. | 29/156.7 R |
| 2,627,651 | 2/1953 | MacGregor | 29/157.1 R |
| 2,868,495 | 1/1959 | Lucas | 251/359 |
| 2,903,564 | 9/1959 | Carr | 29/157.1 R |
| 3,160,952 | 12/1964 | Corney et al. | 29/421 E |
| 3,218,199 | 11/1965 | Cowan | 29/470 |
| 3,258,841 | 7/1966 | Popoff | 29/486 |
| 3,261,088 | 7/1966 | Holtzman | 29/486 |
| 3,263,323 | 8/1966 | Maher et al. | 29/421 E |
| 3,360,848 | 1/1968 | Saia | 29/470 |
| 3,397,444 | 8/1968 | Bergmann et al. | 29/470.1 |
| 3,419,951 | 1/1969 | Carlson | 29/481 |
| 3,474,520 | 10/1969 | Takizawa et al. | 29/470.1 |
| 3,514,840 | 6/1970 | Pitler | 29/481 |
| 3,735,476 | 5/1973 | Deribas et al. | 29/481 |
| 3,859,703 | 1/1975 | Eberhardt | 29/157.1 R |

FOREIGN PATENTS OR APPLICATIONS

| | | | |
|---|---|---|---|
| 1,369,426 | 7/1964 | France | 29/486 |
| 2,002,888 | 1/1970 | Germany | 29/470.2 |
| 17,535 | 8/1967 | Japan | 29/486 |
| 1,206,204 | 9/1970 | United Kingdom | 29/486 |
| 596,332 | 1/1948 | United Kingdom | 251/359 |

*Primary Examiner*—C.W. Lanham
*Assistant Examiner*—Dan C. Crane
*Attorney, Agent, or Firm*—Armstrong, Nikaido & Wegner

[57] ABSTRACT

A valve comprising a valve body and a valve member, said valve body and valve member having cladded seats of hard metal metallurgically connected thereto, and a method for manufacturing said valve comprising a step of metallurgically connecting said seats to the valve body and the valve member through an explosive cladding process.

5 Claims, 20 Drawing Figures

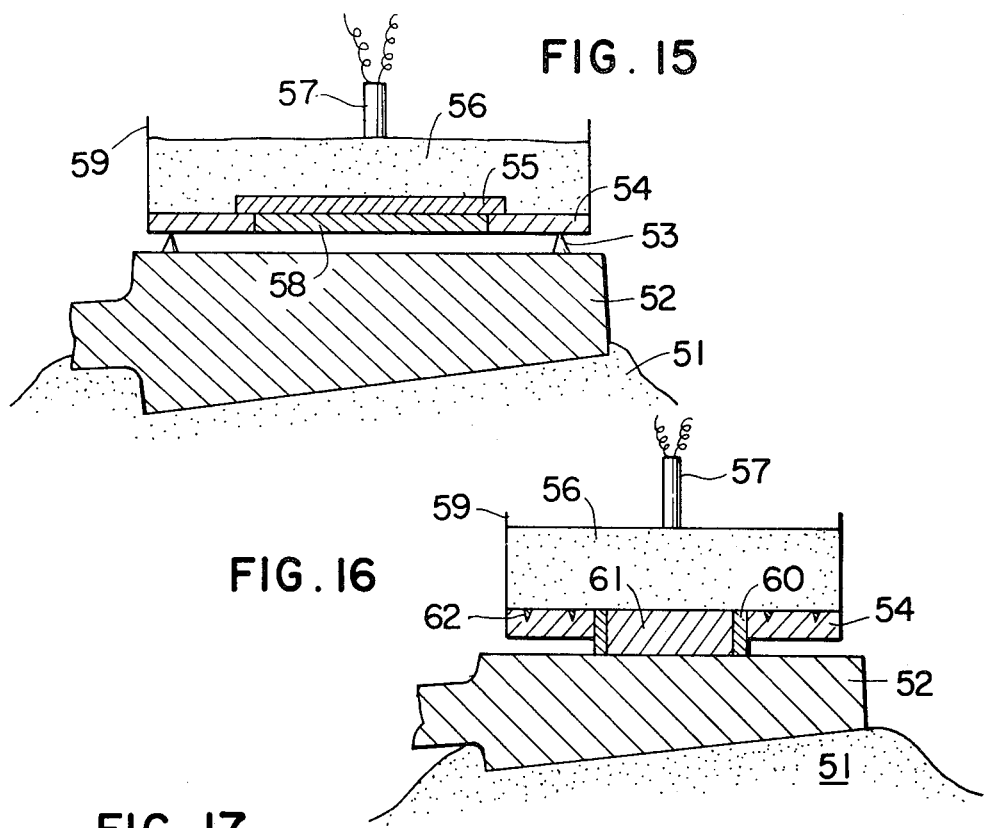
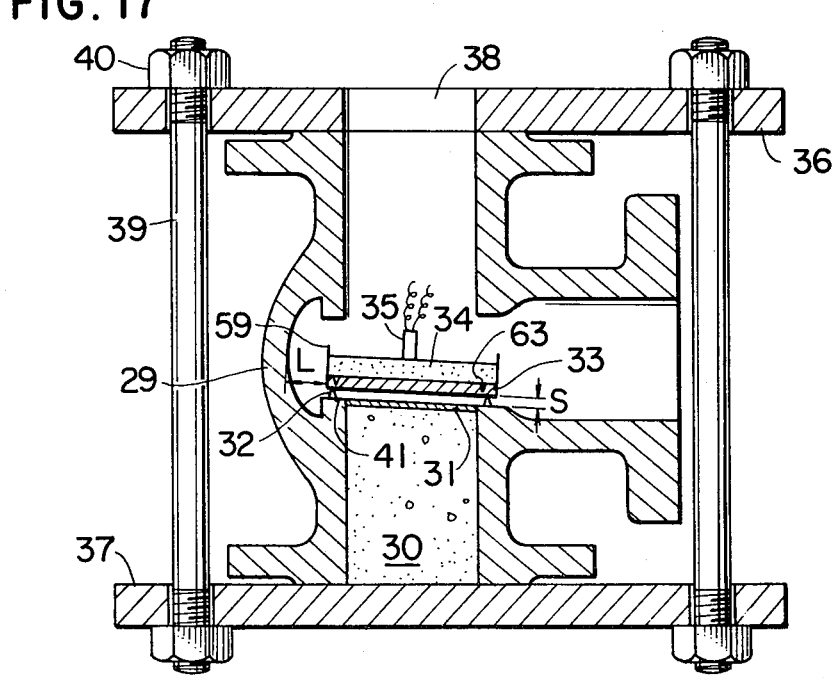

VALVE AND METHOD FOR MANUFACTURING THE SAME

This is a division, of application Ser. No. 294,160, filed Oct. 2, 1972, now abandoned.

BACKGROUND OF THE INVENTION

The present invention relates to a valve of type including a valve body having a stationary valve seat and a valve member having a movable valve seat co-operative with said stationary seat. The present invention further relates to a method for manufacturing a valve of the type referred to above.

Various types of valves have been known and widely used for various applications. These valves include such a type which has a valve body and a movable valve member having co-operative seat surfaces. In order to reduce wear of the seat surfaces, this type of valve usually includes seat members of hard material which are respectively provided on the valve body and the valve member by thread engagement or welding technique. However, the known seat constructions are disadvantageous in various respects. When the seat is attached to the valve body or valve member through thread means, fluid seepage may occur at the thread portion due to distortion or loosening of thread engagement. Further, the provision of the thread portion will require an increased thickness, so that an increased amount of relatively expensive seat material must be used and that the weight of the seat is increased. The increased thickness of the seat on the valve member causes an increase in thickness of the valve member itself resulting in an increase in the movable mass of the valve member. Thus, in this type of valve, a substantial force is required to move the valve member. Further, the increase in dimension of the valve member causes an increase in dimension of the valve body and thus an increase in the total weight of the valve. Still further, this type of valve requires a substantial labour in forging, thread forming, tempering and assembling the same.

In a valve in which seat members are welded on a valve body and valve member, it is impossible to employ corrosion resistant materials such as titanium and zirconium because they do not accept welding. When materials other than those of corrosion resistant type are used, corrosion of the valve material will reduce the life of the valve. Further, this type of valve is also disadvantageous in that increased labour is required in removing welding beads, tempering and machining the valve parts. These problems may be overcome by forming the seat integrally with the valve body or the valve member using a seat material, however, this type of solution is not practical in a usual valve since it requires a large amount of relatively expensive material.

SUMMARY OF THE INVENTION

The present invention has an object to provide a valve which is free from the aforementioned disadvantages and which is simple in construction and has an improved mechanical strength and corrosion resistant property.

A further object of the present invention is to provide a valve which has an increased life and is substantially free from leakage.

Still further object of the present invention is to provide a novel method of manufacturing a valve of the aforementioned type.

According to the present invention, the above objects are achieved by a valve comprising a valve body and a valve member, at least one of which has a valve seat of a hard metal metallurgically connected thereto.

The wording "metallurgically connected" as used herein means that one metal layer is positioned to the other metal layer in such a manner that the atoms of said one layer is placed apart from the atoms of said other layer by distances comparable to the grid distance of an atom. In other words, the surfaces of two layers are in contact with each other with an atomic scale. An important feature of the present invention, there is an abrupt change in the composition of material across the interface of the seat and the valve body or the valve member. Thus, there is no layer of an alloy between the interconnected metal layers.

According to the present invention, the seat which is made of a relatively expensive material can be substantially thinner than that in a conventional valve. Further, the valve member can correspondingly be of light weight construction and thus the total weight of the valve can be substantially reduced. The present invention is further advantageous in that the sealing engagement between the co-operating seat surfaces is improved to provide a reliable sealing property and durability. Further, the valve of the present invention can be manufactured with less labour and thus with less expensive cost as compared with a conventional valve. Further, according to the present invention, it is not necessary to provide lightening recesses to reduce the weight of the valve as is required in a known valve in which a seat is threadably connected to the valve body or valve member.

According to a preferred mode of the valve in accordance with the present invention, the seat is made of an alloy primarily including Fe, Ni, Co and/or Cu and metallurgically connected to the valve body or valve member made of steel or cast iron. More preferably, the seat material comprises a stainless steel, a monel metal, a bronze alloy, titanium, zirconium or a cobalt-based-alloy such as HAYNES ALLOY manufactured and sold by the Union Carbide Company, the valve body and the valve member are made of carbon steel, cast iron, black heart malleable cast iron, spheroidal graphite cast iron, or stainless steel.

The valve in accordance with the present invention can most preferably be manufactured by means of an explosive cladding process so as to provide a metallurgical connection between the seat and the valve body or the valve member in which composition of material is abruptly changed without any layer of alloy. Although a conventional explosive cladding process may be employed in the present invention, a preferred process will be described hereinafter.

The method of the present invention provides various advantages. For example, the method does not require steps of forging, thread forming, providing turning tool accommodating recesses, tempering and threading as is required in a conventional method. Further, the invention is not limited to a use of particular materials. According to the method of the present invention, there are provided further advantages that the hardness of seat material can be increased by the explosive cladding process resulting in an improved strength of the interconnection between the seat and the valve body or the valve member. Further, the present invention can provide an excellent corrosion resistant property. Moreover, there is no limitation in materials to be used.

The above and other objects and features of the present invention will be come apparent from the following descriptions of preferred embodiments illustrated in the accompanying drawings.

BRIEF DESCRIPTION OF THE DRAWINGS

FIG. 15 is a diagrammatical view of one embodiment of the method of the present invention in which a ring-shaped seat is attached to a valve member of a sluice valve by an explosive cladding process;

FIG. 16 is a diagrammatical view of a further embodiment of the method of the present invention for attaching a ring-shaped seat to a valve member of a sluice valve by means of an explosive cladding process;

FIG. 17 is a diagrammatical view showing a further embodiment of the method in accordance with the present invention as applied to the manufacture of a valve body of a sluice valve;

DESCRIPTION OF THE PREFERRED EMBODIMENTS

Figure 1:
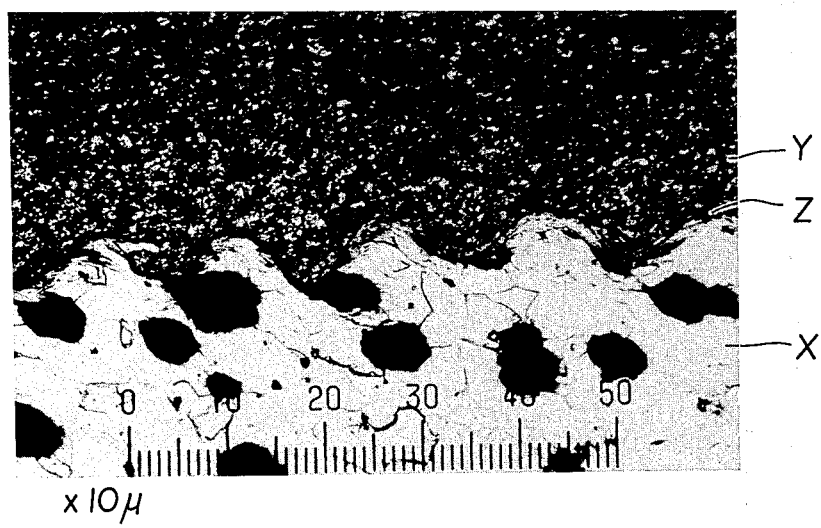
FIG. 1 is a picture microscopically showing a metallurgical connection of a seat in a valve in accordance with the present invention.

FIG. 1 shows a microscopic photograph of a metallurgical connection in accordance with the present invention. In the drawing, the character X designates a base layer of spherical graphite cast iron, Y a cladding layer made of a stainless steel and Z the boundary of the layers.

According to the present invention, a seat for a valve body or a movable valve member made of stainless steel, cobalt-based allow, monel metal, bronze alloy, titanium or zirconium is metallurgically connected to the valve body or the valve member made of black heart malleable cast iron, spheroidal graphite cast iron, cast carbon steel, cast stainless steel, or in some instances a cast iron (hereinafter referred to as "base material").

Figure 2:
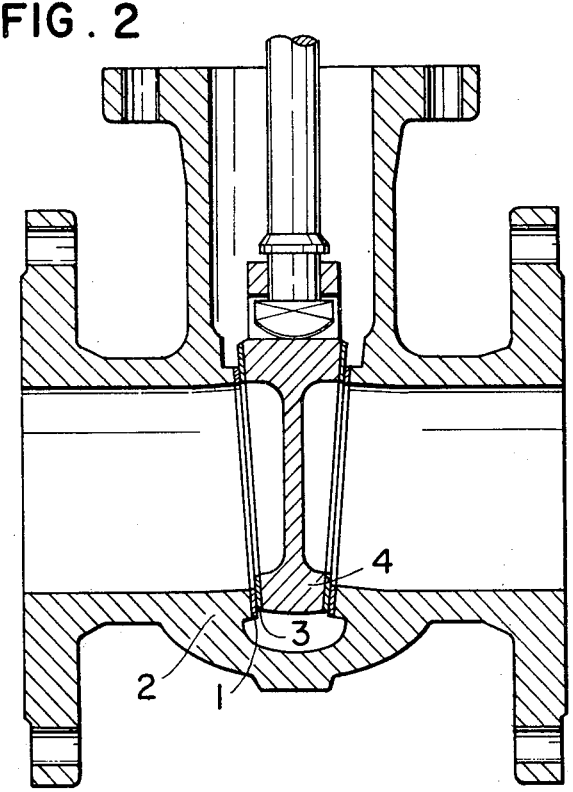
FIG. 2 is a sectional view showing one embodiment of a sluice valve of the present invention.

FIG. 2 is a sectional view of a sluice valve embodying the present invention in which a valve body seat 1 is metallurgically connected to a valve body 2 of the sluice valve, and a valve member seat 2 to a valve member 4.

In this embodiment, the valve body 2 is made of cast carbon steel having a bore size exceeding two inches and the seat 1 of cobalt-based alloy is metallurgically connected to the valve body 2 at a portion where the valve member engages when it blocks fluid passage formed in the valve body. The movable valve member 4 is made of cast carbon steel and the seat 3 made of cobalt-based alloy is metallurgically connected to the valve member 4 at a portion cooperating with the seat 1 on the valve body 2. The portion of the valve body or valve member to which the seat is metallurgically connected will be hereinafter referred to as "seat portion" in this specification.

Figure 3:
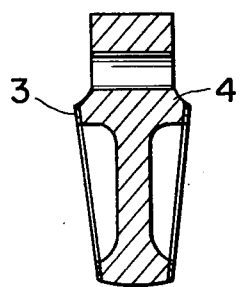
FIGS. 3, 4 and 5 show sectional views of various types of valve members used in the sluice valve shown in FIG. 2.
Figure 4:
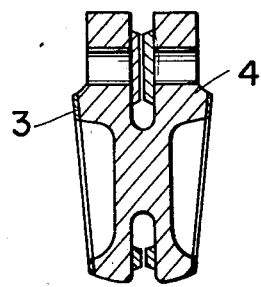
Figure 5:
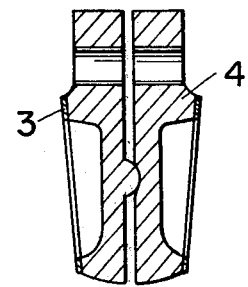

Examples of movable valve member of a sluice valve are shown in FIGS. 3, 4 and 5. FIG. 3 shows a single piece solid type valve member, FIG. 4 a flexible type having a lower portion cut-off at the center thereof, and FIG. 5 a valve member of two piece construction having valve discs pivotally connected together.

Figure 6:
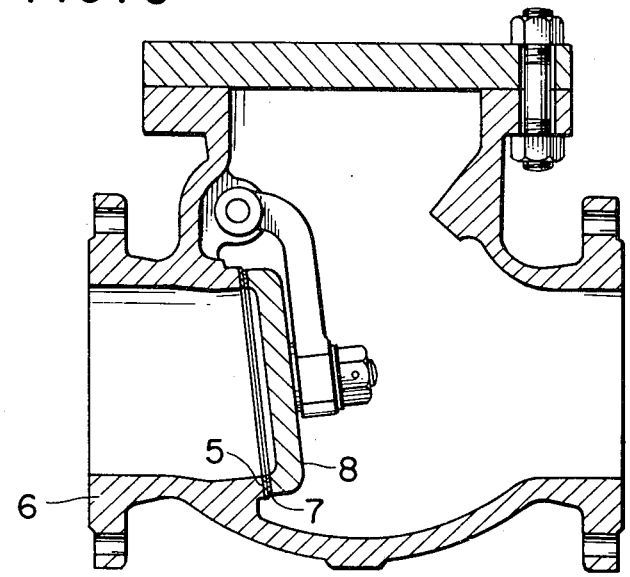
FIG. 6 is a sectional view of a check valve embodying the feature of the present invention.

The present invention will now be described with respect to a check valve taking reference to FIG. 6. In this drawing, a valve body seat 5 made of bronze alloy is metallurgically connected to a valve body 6 made of black heart malleable cast iron, and a valve seat 7 of bronze alloy to a valve member 8 made of black heart malleable cast iron.

Figure 7:
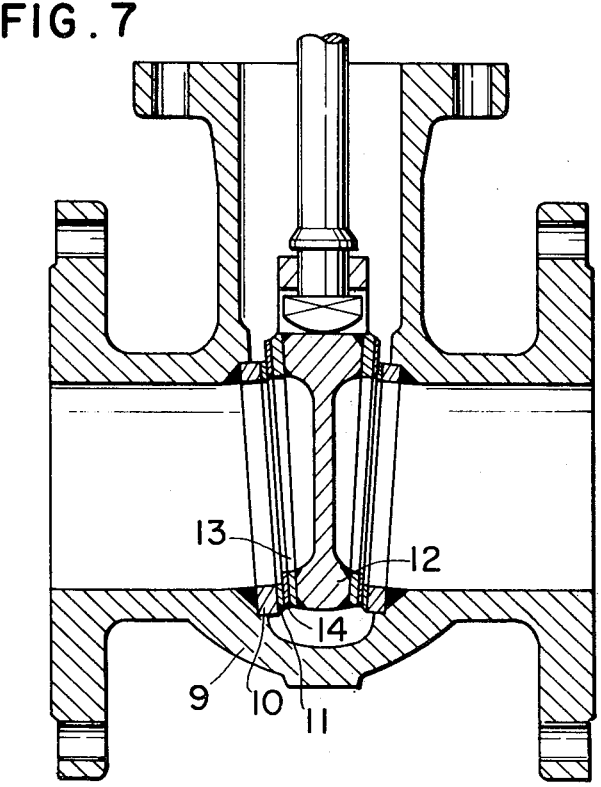
FIG. 7 is a sectional view of a sluice valve embodying the feature of the present invention.

FIG. 7 shows a further embodiment of the present invention in which the principle of the invention is applied to a sluice valve. In this example, a valve body 9 has a backer member 10 welded thereto to form the seat portion thereof and a seat 11 is metallurgically connected to the backer member 10. Similarly, a backer member 13 is welded to a valve member 12, to form the seat portion thereof and a seat 14 is metallurgically connected to the backer member 13.

Figure 8:
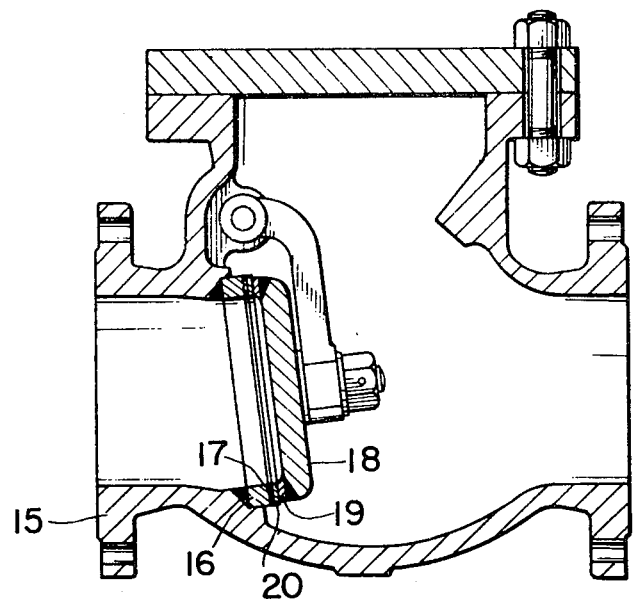
FIG. 8 is a sectional view of a further embodiment of the present invention in which the feature of the present invention is embodied in a check valve.

FIG. 8 shows another form of a check valve embodying the present invention, in which a valve body 15 has a backer member 16 welded thereto, and a seat 17 is metallurgically connected to the backer member 16. Similarly, a valve member 18 has a backer member 19 welded thereto, and a seat 10 is metallurgically connected to the backer member 19.

The valves shown in FIGS. 7 and 8 have welded seat portions, however, in these valves, since weldings are performed among identical or affinitive materials, there is no tendency that corrosion resistant property is deteriorated due to the weldings.

In order to obtain a valve in which a seat is metallurgically connected to a valve body or a valve member, the present invention further proposes to attach the seat to the valve body or the valve member by means of an explosive cladding.

Various ways of performing the explosive cladding method of the present invention will now be described with respect to various configuration and dimension of the valve body, the valve member, and the seats therefor.

Figure 9:
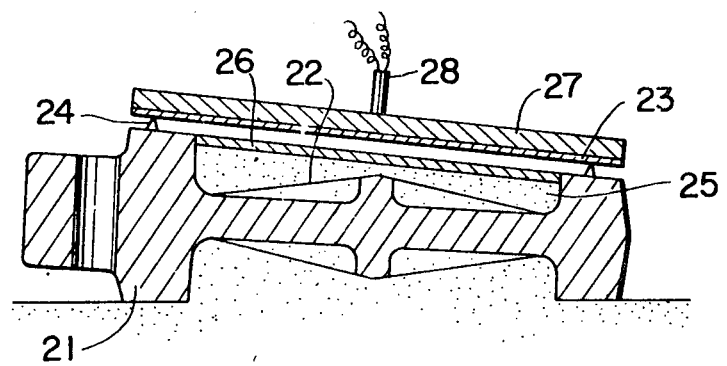
FIG. 9 is a diagrammatical view of a sluice valve having recess means, the drawing being intended to show an example of the method in accordance with the present invention.

FIG. 9 shows a method for attaching a seat to a valve member having recessed portions. The reference numeral 21 designates a valve member having an upper surface provided with a recess 22 at the center portion thereof leaving a flat periphery. The numeral 23 designates a cladding metal plate, and 24 a spacer for providing a suitable spacing between the flat peripheral surface of the valve member 21 and the cladding metal plate 23. The recess 22 is filled with filler material 25 and covered by a substantially flat plate 26 so as to provide an uninterrupted flat top surface on the valve member 21. An explosive 27 is placed on the upper surface of the cladding metal plate 23 and provided with an electric detonator 28. When the detonator 28 is energized to effect explosive cladding, the upper surface of the valve member 21 is brought into a metallurgical adhesion with the opposing surface of the cladding plate 23. In this instance, the portion of the cladding plate corresponding to the cover plate 26 is allowed to be instantaneously forced into the recess 22 due to the yieldable property of the filler material 25, so that the cladding plate 23 is sheared along the periphery of the recess 22.

Figure 10:
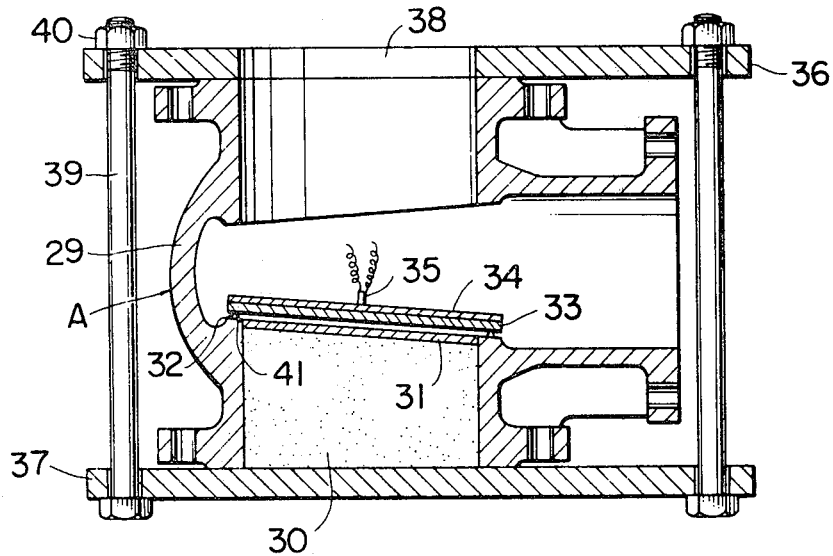
FIG. 10 is a diagrammatical view of a valve body of a sluice valve for showing the method in accordance with the present invention.

FIG. 10 shows a method for attaching a seat to a valve body of a sluice valve. The valve body 29 has a fluid passage portion which is filled with a filler material 30 and covered by a flat plate 31. A cladding plate 33 is positioned on the cover plate 31 with a suitable spacing provided by a spacer 32. An explosive 34 having an electric detonator 35 is placed on the cladding plate 33. The assembly is then placed on, for example, a sand bed and the detonator 35 is energized. Thus, the seat or the cladding plate 33 is metallurgically attached to the valve body.

In the methods shown in FIGS. 9 and 10, the filler material may be selected from powder or granular material such as sand, wooden chips, metal powders, plastic powders or a mixture thereof, viscous material such as starch or gelatine, hardenable material such as gypsum or quick hardening cement, thermoplastic material such as asphalt compound or tar pitch, or a mixture thereof. The filler material is applied to the recess or passage with the intervention of a releasing agent, a film or a thin layer. The filler material may be of any type provided that it is not easily fluidized by the explosive pressure and does not have any adverse effect on the motion of the cladding plate. Thus, there is no limitation on the material and shape of the filler. Further, it is within the scope of the present invention to provide a film or a layer of mineral oil between the filler material and the cladding plate in order to prevent the filler material from adhering to the cladding plate, or to cover the filler material by a plywood, a hard board or a plastic plate in order to prevent the filler material from being splashed during explosion. It would also be necessary when the filler comprises a fusible material to cover the filler by a flat plate in order to prevent molten filler material from being splashed and giving an adverse effect on the explosive cladding.

The aforementioned procedure enables to employ the explosive cladding method in a valve body or a valve member having a recess. Further, the filler material serves to reinforce the valve body or the valve member, so that it is possible to eliminate the risk that the part to be cladded is broken by the explosion pressure.

In the above method applied to a valve body, the explosion pressure is applied to every part on the valve body and produces internal stress therein. Since the internal stress is not uniform throughout the valve body, cracks maya be produced in thinner or weaker parts on the valve body. This problem can be solved by applying an external force on the valve body. Against such portions of the parts to be cladded where cracks may possibly be produced during explosion, external force sufficient to resist the explosive force is applied to the valve body to prevent cracks therein. The external force can be applied by a framework made of a strong material such as steel and assembled around the valve body by means of bolts and nuts. Alternatively, a hydraulically operated cylinder may be used for the purpose. Referring to FIG. 10, the reference numeral 30 designates a filler material, 31 a flat plate covering the filler 30, 32 a spacer, 33 a cladding metal plate for forming a valve body seat, 34 an explosive, and 35 an electric detonator. When the detonator 35 is energized to detonate the explosive, the explosion force acts to expand the valve body so that the portion A is subjected to a substantial tensile force. In the arrangement shown in FIG. 10, a pair of end plates 36 and 37 made of thick steel plates are disposed at the opposite ends of the valve body and connected by means of a plurality of bolts 39 and nuts 40 to apply a precompression on the valve body, so that the tensile force produced on the valve body is counterbalanced by the precompression force. The reference numeral 38 designates a gas escape hole provided in the end plate 36.

When the explosive 34 is fired, the cladding plate 33 is forced under pressure on the portion 41 where the seat is to be formed. In this instance, the portion of the cladding plate 33 above the filler material 30 is allowed to be forced into the passage opening due to the yieldable property of the filler. Thus, the cladding plate 33 is sheared along the periphery of the fluid passage opening leaving an annular portion of the cladding material 33 on the valve body to form a valve seat metallurgically adhered thereto.

Figure 11:
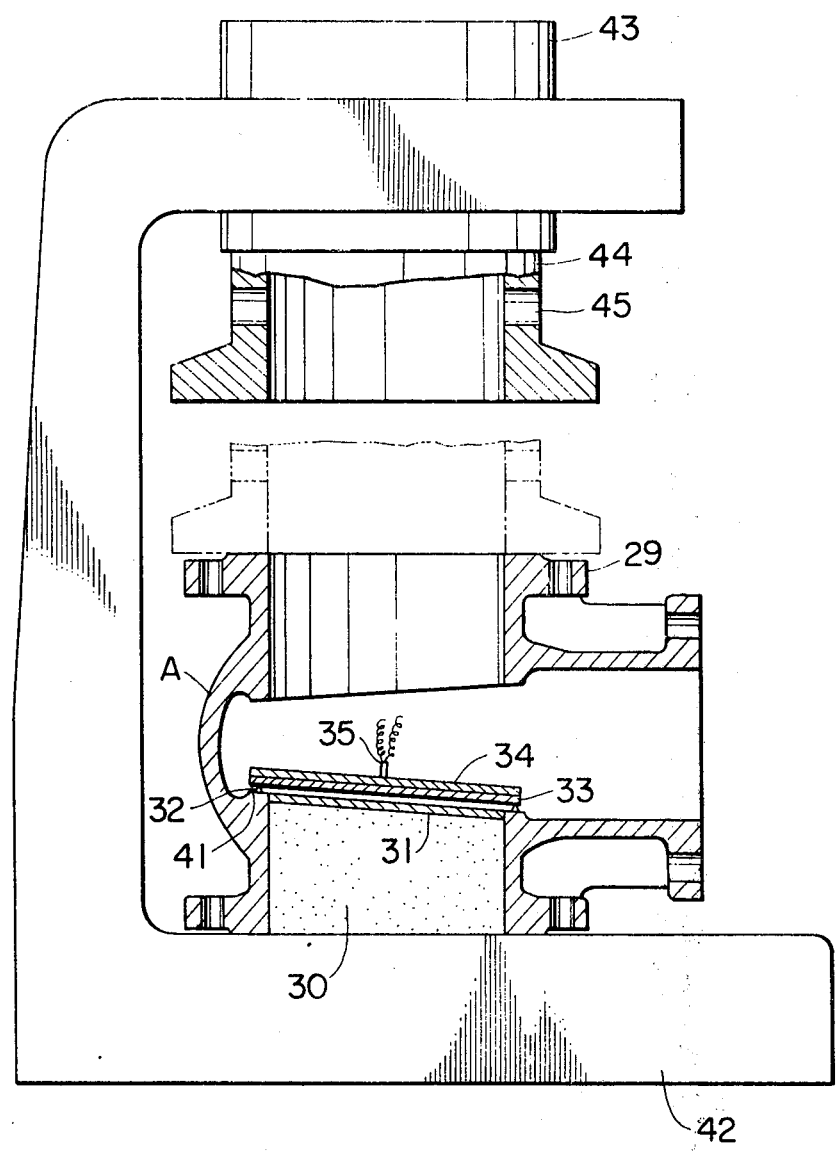
FIG. 11 is a diagrammatical view showing another mode of the method shown in FIG. 10.

FIG. 11 is a side view showing another method for applying a external force on a valve body of a sluice valve. The reference numeral 42 designates a column, 43 a hydraulic cylinder, and 44 a piston. The column 42 is made of an extruded steel having a lower platform for receiving the valve body 29 and an upper arm supporting a hydraulic cylinder 43 and a piston 44. The piston 44 is provided at its periphery with a plurality of gas escape holes 45. In operation, the valve body is placed on the column and then the hydraulic cylinder is actuated. Thus, the piston is lowered until it abuts the valve body. Thereafter, the detonator 35 is energized to fire the explosive 34 so as to make the cladding plate 33 adhered to the valve body to form a valve seat.

In order to produce a valve as shown in FIG. 7 or 8, a cladding plate is attached to a backer member to be weldable to the valve body or the valve member by means of explosive cladding method, then machining the cladder backer member to an annular or a disc shape, and thereafter the backer member is welded to the corresponding portion of the valve body or the valve member.

Figure 12:
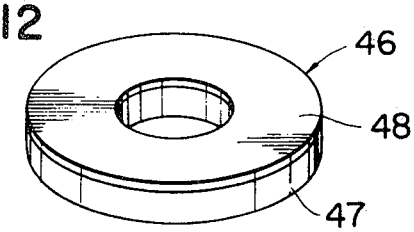
FIG. 12 is a perspective view of a ring which is used in the valve shown in FIGS. 7 or 8 and in which a seat is metallurgically connected to a base.
Figure 13:
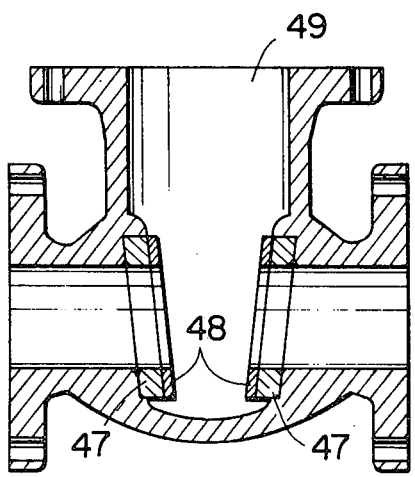
FIG. 13 is a sectional view of the ring shown in FIG. 12 welded to a valve body of a sluice valve.
Figure 14:
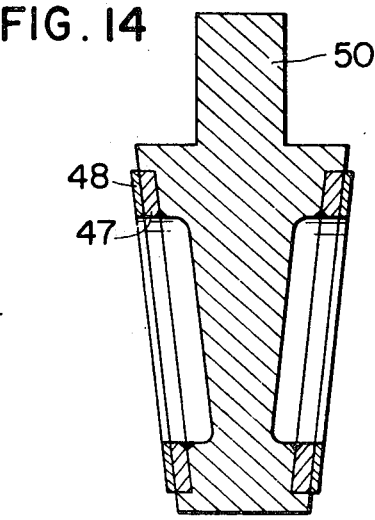
FIG. 14 is a sectional view showing the ring of FIG. 12 welded to a valve member of a sluice valve.

Referring to the drawings, particularly to FIGS. 12, 13 and 14, there are respectively shown a perspective of a cladded seat member, a sectional view of a valve body in which the cladded backer member is welded to the body, and a sectional view of a valve member which has the cladded backer member welded thereto. The cladded backer member 46 is formed by attaching to one side of the base material 47 a cladding plate 48 of a suitable corrosion and wear resistant material such as cobalt based alloy plate and machining it to a shape suitble for welding to a valve body 49 or a valve member 50. The base material 47 of the backer member is made of a material identical to or having a good weldability to the material of the valve member or the valve body. The cladded member 46 is welded at its base material 47 to the corresponding portion of the valve member 50 or the valve body 49 to form a product as shown in FIG. 13 or 14.

In this method, it is possible to securely attach the cladding plate to the base material of the backer member by means of an explosive cladding technique without requiring welding. Further, the base material can readily be welded to the valve body or the valve member. Since the seat material is sufficiently hardened during the explosive cladding, it is not necessary to perform a tempering. It is further possible to simultaneously form a plurality of cladded backer members of different dimensions from a single cladded blank, so that the material can be perfectly utilized without little loss. Hithertofore, in order to provide a seat of stellite of 2 mm thick by means of welding, it has been required to form a relatively thick welded layer of an expensive stellite, for example, a layer of 5 mm thick and thereafter machine the layer to obtain a smooth seat surface. However, according to the present invention, it is only necessary to clad a cobalt based allow plate of 2.5 mm thick to the base material and thereafter machine the cladding material to form a seat of 2 mm thick. Thus, the present invention is effective to simplify the valve manufacturing process and therfore can reduce the manufacturing cost. Further, the seat surface produced by the method of the present invention is well comparable in performance with a seat surface produced by the conventional welding method.

Valve seats for a valve body and for a valve member are generally annular in shape. In order to clad a preformed annular seat member to the valve body or the valve member by means of an explosive cladding technique, an auxiliary plate made of a rigid material and having a diameter lager than the inner diameter of the annular seat member may be put to cover the central aperture of the seat member.

Referring to FIG. 15, a valve member 52 is placed on a suitable support 51 such as sand, and an annular seat or cladding member 54 is placed on the valve member 52 with the intervention of a spacer 53. An auxiliary plate 55 of rigid material such as metal, wood or plastics is placed on the aperture of the annular seat member 54. Thereafter, an explosive 56 having an electric detonator 57 is placed on the seat member 54 and the auxiliary plate 55 and then the detonator is energized to fire the explosive. Thus, the seat member 54 is cladded to the valve member 54. When the auxiliary plate 55 is made of a metal, the plate may adhere to the valve member 52 during explosion. In such case, the auxiliary plate 55 may be cut off from the valve member. If the aperture of the seat member 54 is filled with a plywood plate 58 or the like prior to the explosion, it is possible to prevent the auxiliary plate 55 from adhering to the valve member 52.

According to this method, an annular seat member or cladding plate is used, so that the material is effectively used and that the process is further simplified since it is not necessary to remove a punched-off central portion of the cladding plate.

Further, it is also possible in cladding an annular cladding seat plate to a valve member to place a ring in contact with the inner periphery of the cladding plate and if necessary to fill the interior of the ring by a laminated material such as a plywood, rubber plate or plastics, or a thermoplastic filler material such as asphalt compound, or a combination thereof. Alternatively, a rod may be fitted to the aperture of the annular cladding plate. Thus, the annular cladding plate is supported by the ring or the rod and an explosive is fired on the whole surface of the cladding plate. This method is described taking reference to FIG. 16 in which the numeral 52 designates a valve member disposed substantially horizontally and having a ground upper surface, and 60 a ring for securing a cladding seat plate 54 with a clearance from the valve member 52 and preventing the explosive gas from escaping toward the space between the seat plate 54 and the valve member 52. The ring 60 comprises a cylindrical member closely fitted to the aperture of the annular cladding plate 54. The reference numeral 61 designates a filler made of a rubber plate inserted into the cylindrical member or a ring 60. The reference numeral 59 designates a boundary wall made of a hard board and secured to the outer periphery of the cladding plade by an adhesive tape or the like. Within the boundary wall 59, there is filled powder explosive 56 including penthrite as the principal ingredient, and an electric detonator 57 is energized to fire the explosive. Thus, the cladding material is adhered to the valve body.

Here again, since an annular cladding plate is used in this method, advantages can be obtained as in the previously described methods.

In cladding a seat member to a valve body, a cladding seat member is made in such a dimension that the outer diameter is smaller than the outer diameter of the seat portion in the valve body and provided with a circumferential groove on the upper surface thereof at a position slightly inside the outer periphery. The cladding plate is further dimensioned so that the clearance L between the inner wall surface of the valve body and the edge of the cladding plate has the following relation with respect to the thickness T of the cladding plate. $L \geq 0.5\ T$. Further, the cladding plate is positioned with a spacing S with respect to the seat portion on the valve body, said spacing S having the relation $S = KT$ ($K = 0.3$ to $3$) with respect to the thickness T of the cladding plate. Then, an explosive cladding is performed.

The method will now be described taking reference to FIG. 17 in which a cladding seat member 33 is prepared to have an outer diameter smaller than the outer peripheral diameter of a seat portion 41 of a valve body 29 and also to such a dimension that the clearance L between the inner wall surface of the valve body 29 and the outer peripheral edge of the cladding plate 33 has a relation $L \geq 0.5\ T$ with respect to the thickness T of the cladding plate. The cladding plate 33 is co-axially provided with a circumferential groove 63 on the upper surface thereof. The cladding plate 33 is then placed in the valve body 29 with a spacing $S = KT$ ($K = 0.3$ to $3$) with respect to the seat portion 41 on the valve body 29. The arrangements of a filler 30, a flat plate 31, a spacer 32, an explosive 34, a detonator 35, end plates 36 and 37, a gas escape opening 38, bolts 39 and nuts 40 are the same as those in the example shown in FIG. 10. When the detonator 35 is energized to fire the explosive 34, the cladding plate 33 is caused to adhere to the seat portion 41 of the valve body 29. At the same time, the cladding plate 33 is sheared along the inner periphery of the valve portion 41 to remove the central portion and along the circumferential groove 63 to remove the outer peripheral portion.

In this method, the cladding seat plate 33 has an outer diameter smaller than the outer peripheral diameter of the seat portion on the valve body so that the cladding plate should not extend from the seat portion 41. The difference between the outer diameter of the cladding plate 33 and that of the seat portion may vary with the size and type of the seat portion but is not necessary to exceed 10 mm. Preferably, the outer periphery of the cladding plate is at a position 5 mm inside the outer periphery of the valve seat portion. If the cladding plate is too small, the width of the seat is excessively reduced and an undesirable result will be obtained.

If the diameter of the circumferential groove 63 formed in the cladding plate 33 is excessively small, the width of the cladding seat plate will be reduced. Thus, it is preferable that the groove 63 is positioned 2 to 5 mm inside the outer periphery of the valve seat portion.

When the explosive cladding is performed without specifying the values L and S, unacceptable products have been produced with 80 percent of probability. According to the aforementioned method, the probability of unacceptable products can be reduced to about 3 percent by specifying the spacing S between the seat portion of the valve body and the cladding plate as well as the clearance L between the inner wall of the valve body and the outer peripheral edge of the cladding plate as described above.

If the constant K is larger than 3.0, an excessive impact force is applied to the valve seat portion and the wall surface of the valve body and there is a possibility that the valve body is broken. If the constant K is smaller than 0.3, it is very difficult to apply the cladding plate to the seat portion unless a very large quantity of explosive is used. When the thickness of the cladding plate is relatively thick, the value K should be relatively large within said limit. If the clearance L is smaller than 0.5 T, the air in the space between the cladding plate and the valve body wall is driven toward the valve body wall surface, and gives an adverse effect on the explosive cladding operation.

Figure 18:
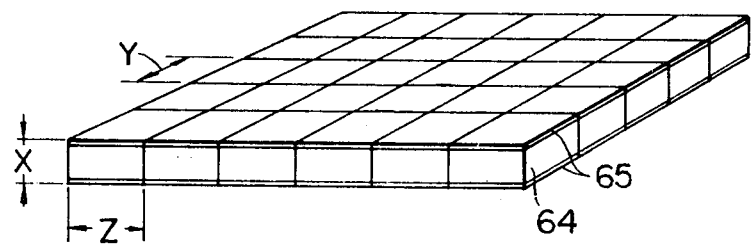
FIG. 18 is a perspective view showing a metal plate having cladding materials attached by means of an explosive cladding process to the opposite sides thereof to form seats on a valve member of a sluice valve which has no recess.
Figure 19:
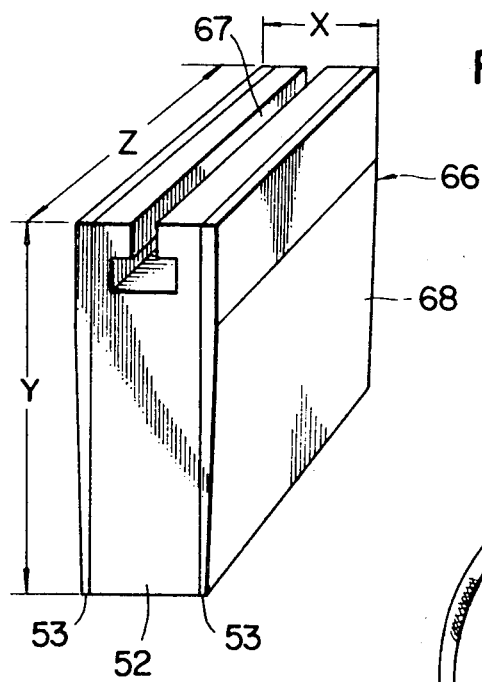
FIG. 19 shows a perspective view of a valve member of a sluice valve which is produced from the metal plate shown in FIG. 18; and, FIG. 20 is a diagrammatical view showing the method of the present invention for simultaneously attaching two seats to the opposite sides of a valve member.

It is also possible, in accordance with the present invention, to manufacture a valve member of a sluice valve by applying cladding seat plates to the opposite surfaces of a base plate by means of explosive cladding method and then cutting and machining the cladded base plate to form the valve member. FIG. 18 is a perspective view showing a cladded plate having the same thickness as the valve member and including cladding layer of corrosion and wear resistant material. The cladded plate is shown as being cut into pieces to form individual valve members. FIG. 19 shows in perspective view a valve member formed by the step shown in FIG. 18. Referring to the drawings in detail, the reference numeral 64 designates a base plate to which cladding seat plates 65 of a corrosion and wear resistant material are attached at the opposite sides by means of explosive cladding technique to form a cladded blank plate. The blank plate is then cut into rectangular pieces which are then machined to form receptacles 67 for valve stems at the upper portions thereof and to form tapered portions 68 at the opposite sides thereof to provide a valve member 66. The valve member 66 has a thickness X, height Y and width Z.

In order to manufacture a valve disc as shown in FIG. 19, the cladded blank plate having a thickness X as shown in FIG. 18 is cut into rectangular pieces having a height Y and width Z. The pieces are then secured with the cladded surfaces opposing with each other and machined to form valve stem receptacles 67. Then, each of the pieces is machined at its opposite sides to form tapered portions 68. Thus, the valve member 66 is completed. From the above description, it will be clear that the valve member 66 can be manufactured with a very simple method including steps of providing a block cladded at the opposite sides with seat plates made of corrosion and wear resistant material such as 13 chlomium steel, HAYNES ALLOY (a cobalt based alloy) or hard steel, cutting the block plates into rectangular pieces, machining each of the pieces to form a recess for receiving a valve stem, and then machining the piece to provide tapered portions at the cladded side surfaces. It is of course possible to use wide variety of materials for the base plate as well as for the cladding plate. Thus, it is possible to manufacture a lot of valve members with a less expensive cost.

Figure 20:
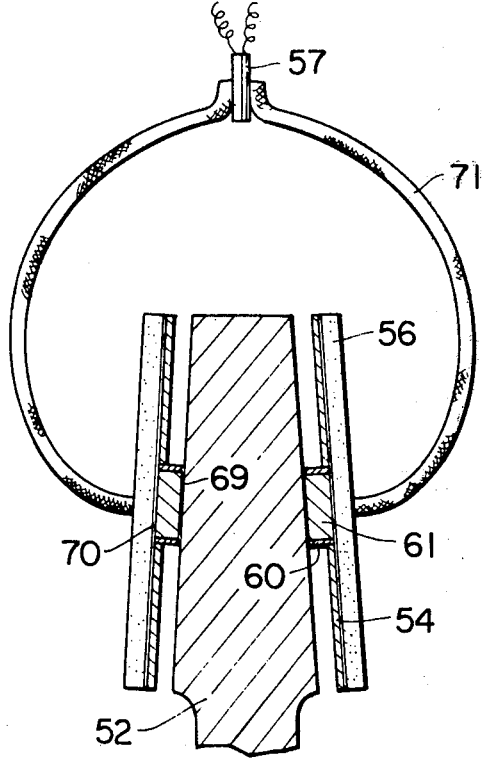

A valve member for a sluice valve has seats provided at the opposite side surfaces thereof. In providing such a valve member, it is not practical to perform explosive cladding separately for each side so that it would be required to perform explosive cladding operation simultaneously at the both sides of the base plate. In this case, if the explosions at the both sides of the plate are not perfectly synchronized, the explosion at one side will disturb positioning of the cladding plate and the explosive at the other side, so that a desired result cannot be obtained at the other side. In order to eliminate this problem, it is recommendable to connect one end of each of two detonating fuses of the same length is connected to the center of each of the explosives disposed on the cladding plates at the opposite sides of the base plate, the other end of each detonating fuse being connected to a common detonator. Thus, the explosives at the both sides can be fired simultaneously through two fuses when the detonator is fired, so that the cladding plates can be applied simultaneously to the both sides of the base plate. This process will now be described taking reference to FIG. 20. Referring to the drawing, a ring 60 having an outer diameter equal to an aperture in an annular cladding plate 54 is secured to each side of a valve member 52 by means of an adhesive tape 69 or the like. The ring 60 is filled with filler material 61. Each of the cladding plates 54 is supported by each ring 60. An explosive 56 is secured by means such as an adhesive tape 70 on each cladding plate 54 and filler 61. The valve member 52 is supported by a suitable support table. Two detonating fuses 71 of the same length are connected at one of their ends to the centers of the explosives 56, respectively, and at the other of their ends to a common electric detonator 57. When the detonator 57 is fired, the explosives 56 are simultaneously fired through the detonating fuses 71, so that the cladding plates 54 are simultaneously applied to the valve member 52.

In the above method, each of the cladding plates 54 is mounted on the valve member 52 through a ring 60 and the filler 61, however, it should be noted that the method is also applicable to a valve member having cladding plates different shape. Further, te cladding plates can be positioned on the valve member by any means other than the ring and the filler.

EXAMPLE 1

A valve body of a sluice valve was made by carbon steel SC 49 (Japanese Industrial Standard) in accordance with the method illustrated and described taking reference to FIG. 10. The valve body was for a valve of ANS1 150 LB and had a port opening of 6B. River sand was used as the filler 30, and the flat cover plate 31 was constituted by a hard board of 2 mm thick and 152 mm in diameter. The spacer 32 was prepared by a steel piece of 2 mm high, the cladding plate 33 by a stainless steel SUS52 (Japanese Industrial Standard) plate of 2.5 mm thick and 178 mm in diameter, the explosive by an ammonia genatine dynamite of 350 g in weight, and the detonator by a No. 6 electric detonator (Japanese Industrial Standard). Each of the end plates 36 and 37 was constituted by a steel plate of 50 mm thick and 610 mm in diameter and provided with 6 bolt holes drilled at equi-distant positions on a circle of 480 mm in diameter. A gas escape hole 38 of 150 mm in diameter was formed in the center of the end plate 36. The end plates 36 and 37 were secured to the valve body by means of hexagonal steel bolts 39 of 50 mm in diameter and 350 mm long and hexagonal steel nuts 40 engaging with the bolts 39. The assembly was then subjected to explosive cladding as described with reference to FIG. 10 by firing the detonator 35. It has been found that a valve seat could be cladded to the valve body without producing any damage on the valve body.

EXAMPLE 2

A valve member of 30 mm thick and 300 mm in diameter was produced from steel material in accordance with the method illustrated in and described taking reference to FIG. 15. The base member 52 was ground at one side by a No. 120 grinder and place substantially horizontally on a sand bed with the ground surface top side. The space 53 was constituted by a steel piece of 3 mm high so as to provide a uniform spacing between the base member 52 and the cladding plate 54 which was constituted by an annular stainless steel of 3 mm thick, 340 mm in diameter and 200 mm in inner diameter. A boundary wall 59 of hard board of 0.5 mm thick and 50 mm wide was placed by means of an adhesive tape around the cladding plate 54 so as to hold the explosive in the area encircle thereby. A plywood 58 of 200 mm in outer diameter and 3 mm thick is fitted in the central aperture of the cladding plate 54 and a steel plate 55 of 2 mm thick and 220 mm in diameter was placed on the plywood 58. The plywood 58, the steel plate 55 and the cladding plate 54 were secured together by means of an adhesive tape. On the assembly of the cladding plate 54, the steel plate 55 and the plywood 58, there is disposed a certain amount of explosive 56 including penthrite as the principal ingredient in a layer of 25 mm thick. Then, the explosive 56 is fired by using an electric detonator 57 to make the cladding plate 54 adhere to the valve member. An investigation has revealed that the annular cladding plate was satisfactorily adhered to the valve member except an area 10 mm in width from the inner periphery thereof.

EXAMPLE 3

A valve member was produced in accordance with a method similar to that employed in the Example 2 except that a wooden plate is used as the auxiliary plate 55 and the filler 58 is not inserted into the aperture of the cladding plate 54. More precisely a steel valve member 52 of 30 mm thick and 180 mm in diameter was ground at one side surface by a No. 120 grinder and horizontally placed on a sand platform with a uniform spacing between the base member 52 and the cladding plate 54 maintained by a spacer 53 made of a steel piece of 3 mm high. The cladding plate 54 was prepared by an annular stainless plate of 3 mm thick, 185 mm in outer diameter and 120 mm in inner diameter, and having a surface ground by a No. 120 grinder. A hard board 59 of 0.5 mm thick and 50 mm wide is wound around the cladding plate and secured in the position by an adhesive tape so as to hold the explosive placed on the upper surface of the cladding plate. A wood plate 55 of 2 mm thick and 140 mm in diameter is placed so as to co-axially cover the central aperture in the cladding plate 54 and secured to the cladding plate by means of an adhesive tape. A certain amount of powder explosive 56 including penthrite as the principal ingredient is placed on the cladding plate 54 and the wood plate 55 in a layer of 25 mm thick. The explosive 56 is then fired by means of an electric detonator 57 to make the cladding plate adhere to the valve member.

The cladding plate was found as being satisfactorily adhered to the steel valve body except an area 12 mm in width from the inner periphery of the cladding plate.

EXAMPLE 4

A valve member was produced from a steel of 30 mm thick and 300 mm in diameter in accordance with the method illustrated and described taking reference to FIG. 16. The valve member 52 is placed on a sand bed 51 substantially horizontally. The reference numeral 60 designates a steel ring of 200 mm in outer diameter, 7 mm thick and 5 mm long for maintaining the clearance between the cladding plate 54 and the valve member 52 and for serving to prevent the explosion gas from escaping into the clearance. The annular cladding plate is made of a stainless steel of 320 mm in outer diameter and 200 mm in inner diameter and provided with circumferential grooves 62 of 1.5 mm deep at position 10 mm inside from the outer periphery and 5 mm outside from the inner periphery. The steel ring 52 is fitted to the aperture of the cladding plate with the upper edge flush with the upper surface of the cladding plate 54. Thus, a clearance of 1.5 mm is maintained between the cladding plate and the valve member and, at the same time, the explosive gas is prevented from escaping into the clearance. The reference numeral 59 designates a hard board of 0.5 mm thick and 50 mm in diameter disposed around the outer periphery of the cladding plate. The cladding plate 54 is co-axially placed on the valve member 52, and a plywood 61 of 186 mm in outer diameter and 5 mm thick is fitted to the aperture of the cladding plate. Above the cladding plate and the plywood, there is disposed a certain amount of powder explosive 56 including penthrite as the principal ingredient in a uniform layer of 25 mm thick. Then, the explosive is fired by using an electric detonator 57 to make the cladding plate adhere to the steel valve member.

The annular cladding plate was found as being sheared at the grooves 62 and adhered to the valve member in the form of an annular band of 190 mm wide. The cladding plate was satisfactorily adhered to the valve member except an area 6 to 8 mm in width from the inner periphery.

EXAMPLE 5

A valve member was produced in accordance with the method similar to that of the Example 2 except that the steel valve member 52 was 150 mm in outer diameter and 30 mm thick, and the cladding stainless steel plate 54 was 185 mm in outer diameter, 140 mm in inner diameter and 3 mm thick, a steel plate of 140 mm in diameter and 6 mm thick being fitted to the aperture of the cladding plate so as to provide a flush upper surface. The annular cladding plate was satisfactorily adhered to the valve member as the result of the explosion.

EXAMPLE 6

A valve body was produced in accordance with the method illustrated by and described with reference to FIG. 17. The valve body 29 is securely held against deformation by a pair of end plates 36 and 37 as well as bolts 39 and nuts 40. The passage portion of the valve body is then filled with sand 30 and a cover 31 of a plywood disc is positioned thereon so that the cover is substantially parallel with the valve seat portion 41. The valve seat portion 41 was 185 mm in outer diameter and 140 mm in inner diameter and polished by a No. 200 buffer. A cladding plate 33 is made of SUS 52 (Japanese Industrial Standard) and 2 mm thick and 175 mm in diameter, and provided at its upper surface with a groove 63 of 1 mm deep, 1 mm wide and 170 mm in diameter. The cladding plate 33 with the boundary wall 59 of a hard board is placed on the valve seat portion 41 with the intervention of a spacer 32 so as to provide a space $S = 0.7 \times 2.0$ mm with respect to the seat portion leaving a clearance $L = 0.8 \times 2$ mm between the inner wall surface and the outer peripheral edge of the cladding plate. Above the cladding plate, there is disposed a powder explosive 34 comprising 78% of low density ammonium nitrate, 10% of penthrite and 12% starch with a density of 15 kg/m². The explosive 34 is then fired by means of an electric detonator 35 to make the cladding plate adhere to the seat portion on the valve body. A supersonic test of the portion of connection between the cladding plate and the valve body revealed that a satisfactory adhesion is made along the whole circumferential extent of the valve seat.

EXAMPLE 7

A valve body was produced by using a base material similar to the Example 6 and a cladding plate made of HASTELLOY and having a thickness of 0.3 mm and diameter of 175 mm was placed on the seat portion of the valve body with a space $S = 1.0 \times 0.3$ mm leaving a clearance $L = 5 \times 0.3$ mm between the inner wall surface and the outer peripheral edge of the cladding plate. An explosive as used in the Example 6 is placed on the cladding plate with a density of 10 kg/m². Then, the explosive was fired. A supersonic test after explosive cladding has revealed that the cladding plate is satisfactorily adhered to the valve body along the whole circumferential extent of the cladding plate.

1. Method for manufacturing a valve comprising a valve body and a valve member, at least one of which has a seat attached thereto at a seat portion thereof and a recess adjacent to the junction between said seat and seat portion, said method comprising steps of placing a compressible filler material in said recess, placing a cladding plate in an opposite relationship to said seat portion with a predetermined space therebetween, forcing said cladding plate to the seat portion under an explosion pressure to thereby bond said cladding plate to said seat portion and shear said cladding plate along the periphery of said recess.

2. A method in accordance with claim 1 including applying an external force sufficient to resist the explosion pressure to said valve body.

3. A method of manufacturing a valve in accordance with claim 1, in which said filler material comprises a mass of powder or granular material aggregated to a suitable density.

4. A method of manufacturing a valve in accordance with claim 3, in which said granular material is sand.

5. A method of manufacturing a valve according to claim 1, including placing a detonator in a position aligned with the axis of said seat portion.

* * * * *